(12) United States Patent
Oonishi

(10) Patent No.: US 10,386,811 B2
(45) Date of Patent: Aug. 20, 2019

(54) NUMERICAL CONTROLLER

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/876,470

(22) Filed: Jan. 22, 2018

(65) Prior Publication Data

US 2018/0217574 A1    Aug. 2, 2018

(30) Foreign Application Priority Data

Jan. 27, 2017    (JP) ................................. 2017-013339

(51) Int. Cl.
*G05B 19/27*     (2006.01)
*G05B 19/042*    (2006.01)
*G05B 19/19*     (2006.01)

(52) U.S. Cl.
CPC ........... *G05B 19/27* (2013.01); *G05B 19/042* (2013.01); *G05B 19/195* (2013.01); *G05B 2219/34013* (2013.01)

(58) Field of Classification Search
CPC .... G05B 19/351; G05B 19/19; G05B 19/231; G05B 19/232; G05B 19/416
USPC ....................................................... 318/600
See application file for complete search history.

(56) References Cited

U.S. PATENT DOCUMENTS

| 5,309,074 | A | * | 5/1994 | Mizukami | ............ | G05B 19/416 |
| | | | | | | 318/571 |
| 7,039,494 | B2 | | 5/2006 | Otsuki et al. | | |
| 2005/0033459 | A1 | | 2/2005 | Otsuki et al. | | |
| 2005/0283269 | A1 | * | 12/2005 | Genma | .............. | G05B 19/4068 |
| | | | | | | 700/177 |
| 2011/0166693 | A1 | * | 7/2011 | Nishibashi | ......... | G05B 19/4103 |
| | | | | | | 700/187 |

FOREIGN PATENT DOCUMENTS

| JP | 5-4181 | 1/1993 |
| JP | 2001-92508 | 4/2001 |

(Continued)

*Primary Examiner* — Kawing Chan
*Assistant Examiner* — Bradley R Brown
(74) *Attorney, Agent, or Firm* — Wenderoth, Lind & Ponack, L.L.P.

(57) ABSTRACT

To provide a controller capable of exerting acceleration/deceleration control more accurately than has been exerted conventionally and capable of reducing the occurrence of shock and shortening cycle time. A numerical controller outputs a movement command for a drive axis of a machine based on a command in a program for controlling the machine having the drive axis controlled by a servo motor. The numerical controller exerts acceleration/deceleration control over the drive axis so as to satisfy a condition for the acceleration/deceleration in each of a machine coordinate system as an orthogonal coordinate system in the machine and a drive axis coordinate system by normalizing each of acceleration/deceleration related information in the machine coordinate system and acceleration/deceleration related information in the drive axis coordinate system to a value in the drive axis coordinate system.

6 Claims, 13 Drawing Sheets

(56) References Cited

FOREIGN PATENT DOCUMENTS

| JP | 2001-100828 | 4/2001 |
|----|-------------|--------|
| JP | 2002-366208 | 12/2002 |
| JP | 2003-15715 | 1/2003 |
| JP | 2005-56171 | 3/2005 |
| JP | 3830475 | 7/2006 |
| JP | 2013-97736 | 5/2013 |
| WO | 2011/064816 | 6/2011 |

* cited by examiner

MACHINE CONFIGURATION TREE

FIG. 12A - PRIOR ART
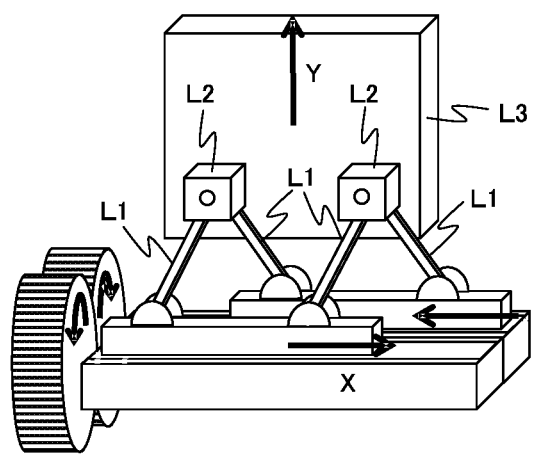
FIG. 12B - PRIOR ART
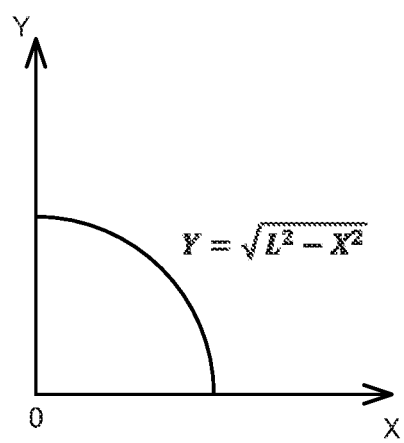

NUMERICAL CONTROLLER

This application is based on and claims the benefit of priority from Japanese Patent Application No. 2017-013339, filed on 27 Jan. 2017, the content of which is incorporated herein by reference.

BACKGROUND OF THE INVENTION

Field of the Invention

The present invention relates to a numerical controller that outputs a movement command for a drive axis of a machine based on a command in a program for controlling the machine having the drive axis controlled by a servo motor.

Related Art

For conventional acceleration/deceleration control in a controller such as a numerical controller for controlling a machine, for example, the coordinate value of a drive axis has generally been used for the acceleration/deceleration control based on a setting made for each drive axis.

Patent Document 1: Japanese Patent. No. 3830475

SUMMARY OF THE INVENTION

In a partial machine configuration, however, the movement amount and the movement direction of a drive axis do not always agree with the movement amount and the movement direction of a tool or a workpiece in an orthogonal coordinate system in a machine. Hence, even if acceleration control or jerk control is exerted in a coordinate system of the drive axis, high acceleration might be applied to the tool or the workpiece in the orthogonal coordinate system in the machine to cause shock in some cases. In the following description, a coordinate system representing the coordinate value of each drive axis will be called a "drive axis coordinate system," and an orthogonal coordinate system in a machine will be called a "machine coordinate system."

A machine configuration shown in FIG. 12A is thinkable, for example. In this machine configuration, two leg portions L1, L1 assembled like a pair of compasses have respective lower feet rotatably fixed to drive axes X to move in opposite directions. Further, a workpiece L3 is supported by an opening/closing portion L2 where the two leg portions L1, L1 are rotatably connected. This machine configuration includes a mechanism of moving in a Y-axis direction vertical to the X axes in response to movements of the lower feet in the X-axis directions. In such a machine configuration, even speed or acceleration at a coordinate value X in a drive axis coordinate system is constant, speed or acceleration at a coordinate value Y of a workpiece in a machine coordinate system is not always constant. Hence, even if acceleration control is exerted in a drive axis coordinate system, high acceleration might be caused in the machine coordinate system to cause the likelihood of the occurrence of shock. Conversely, unnecessary deceleration might be made in the machine coordinate system. Further, setting for acceleration control in the X-axis directions is made by considering a case where acceleration at the coordinate value Y is at maximum. This causes increase in cycle time.

In this regard, according to a technique described in patent document 1, a movement command in an orthogonal coordinate system (above-described machine coordinate system) is converted to a value in a drive axis coordinate system. Then, based on an allowance such as maximum allowable acceleration set for each drive axis, for example, acceleration/deceleration control is exerted in a drive axis coordinate system. Hence, there is no guarantee that the acceleration/deceleration in the orthogonal coordinate system will fall within the allowance.

It is therefore an object of the present invention to provide a controller capable of exerting acceleration/deceleration control more accurately than has been exerted conventionally and capable of reducing the occurrence of shock and shortening cycle time.

(1) A numerical controller according to the present invention is a numerical controller (numerical controller 1 described later, for example) that outputs a movement command for a drive axis of a machine based on a command in a program for controlling the machine having the drive axis controlled by a servo motor. The numerical controller exerts acceleration/deceleration control over the drive axis so as to satisfy a condition for the acceleration/deceleration in each of a machine coordinate system as an orthogonal coordinate system in the machine and a drive axis coordinate system by normalizing each of acceleration/deceleration related information in the machine coordinate system and acceleration/deceleration related information in the drive axis coordinate system to a value in the drive axis coordinate system.

(2) A numerical controller according to the present invention is a numerical controller (numerical controller 1 described later, for example) that outputs a movement command for a drive axis of a machine based on a command in a program for controlling the machine having the drive axis controlled by a servo motor. The numerical controller includes: a control target tangential direction acceleration calculation unit (control target tangential direction acceleration calculation unit 114 described later, for example) that calculates control target tangential direction acceleration related information as tangential direction acceleration related information about a control target in a machine coordinate system as an orthogonal coordinate system in the machine based on the position of the control target in the machine coordinate system and control target maximum allowable acceleration related information about each orthogonal axis; a control target speed limit calculation unit (control target speed limit calculation unit 115 described later, for example) that calculates control target speed limit as speed limit for the control target in the orthogonal coordinate system based on the position of the control target and the control target maximum allowable acceleration related information; a conversion unit (conversion unit 116 described later, for example) that sets a coordinate system representing the coordinate value of the drive axis as a drive axis coordinate system, and converts the position and the movement amount of the control target contained in the command in the program to the position and the movement amount of the drive axis in the drive axis coordinate system; a drive axis tangential direction acceleration calculation unit (drive axis tangential direction acceleration calculation unit 117 described later, for example) that calculates drive axis tangential direction acceleration related information as tangential direction acceleration related information about the drive axis based on the position of the drive axis and drive axis maximum allowable acceleration related information about each drive axis; a drive axis speed limit calculation unit (drive axis speed limit calculation unit 118 described later, for example) that calculates drive axis speed limit as speed limit for the drive axis based on the position of the drive axis and the drive axis maximum allowable acceleration related information; a tangential direction acceleration calculation unit (tangential direction acceleration calculation unit 119 described later, for example) that calculates optimum tangential direction acceleration related information as tangential direction acceleration related information to be used for calculation of deceleration target speed based on acceleration related information resulting from conversion of the control target tangential direction acceleration related information to a value in the drive axis coordinate system and the drive axis tangential direction acceleration related information; a speed limit calculation unit (speed limit calculation unit 120 described later, for example) that calculates optimum speed limit as speed limit to be used for the calculation of deceleration target speed based on speed resulting from conversion of the control target speed limit to a value in the drive axis coordinate system and the drive axis speed limit; a deceleration target speed calculation unit (deceleration target speed calculation unit 121 described later, for example) that calculates deceleration target speed based on the position of the drive axis, the optimum tangential direction acceleration related information, and the optimum speed limit; and an acceleration/deceleration processing unit (acceleration/deceleration processing unit 122 described later, for example) that performs acceleration/deceleration processing on the drive axis based on the deceleration target speed.

(3) In the numerical controller described in (2), the control target may include multiple control targets, the control target tangential direction acceleration calculation unit (control target tangential direction acceleration calculation unit 114 described later, for example) may calculate tangential direction acceleration related information about each of the control targets, and the control target speed limit calculation unit (control target speed limit calculation unit 115 described later, for example) may calculate speed limit for each of the control targets.

(4) In the numerical controller described in (2) or (3), each of the control target maximum allowable acceleration related information and the drive axis maximum allowable acceleration related information may include at least one of speed, acceleration, jerk, and a physical quantity calculated by differentiating a position with respect to time three times or more.

(5) In the numerical controller described in (2) or (3), each of the control target tangential direction acceleration related information, the drive axis tangential direction acceleration related information, and the optimum tangential direction acceleration related information may include at least one of acceleration, jerk, and a physical quantity calculated by differentiating a position with respect to time three times or more.

(6) The numerical controller described in any one of to (5) may further include a control point coordinate system calculation unit (control point coordinate system calculation unit 113 described later, for example) that sets machine configuration data reflecting an axis configuration for moving the control target, and calculates the coordinate value of the control target in the orthogonal coordinate system based on the command in the program and the machine configuration data.

According to the present invention, acceleration/deceleration control can be exerted more accurately than has been exerted conventionally, the occurrence of shock can be reduced, and cycle time can be shortened.

BRIEF DESCRIPTION OF THE DRAWINGS

FIG. 12A shows an exemplary configuration of a machine as a target of control by the numerical controller according to the embodiment of the present invention; and FIG. 12B shows an exemplary formula about a relationship between a machine coordinate system and a drive axis coordinate system according to the embodiment of the present invention.

DETAILED DESCRIPTION OF THE INVENTION

An embodiment of the present invention will be described in detail below with reference to FIGS. 1 to 11B.

1. Hardware Configuration of Numerical Controller

Figure 1:
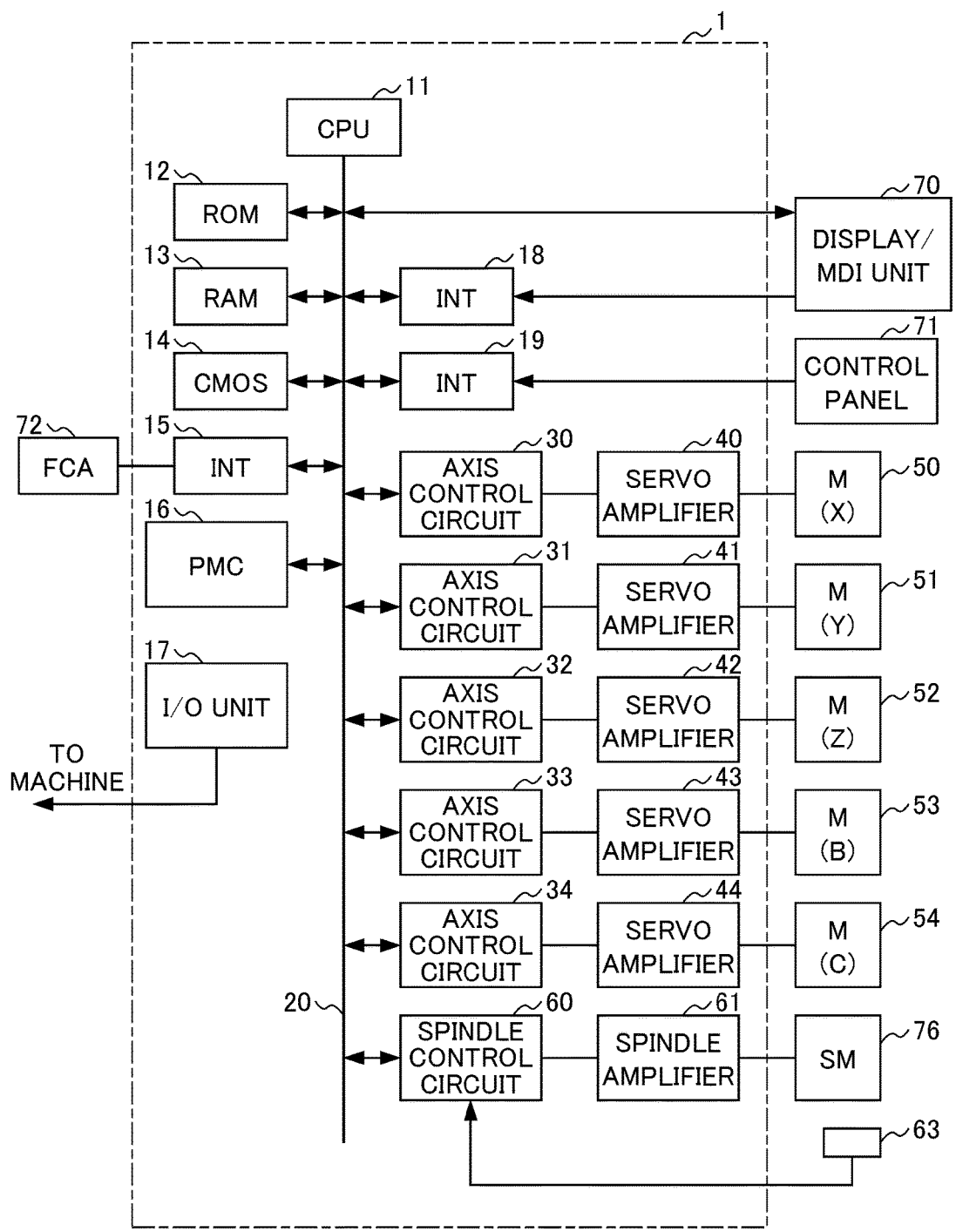
FIG. 1 is a diagram showing the hardware configuration of a numerical controller according to an embodiment of the present invention.

FIG. 1 is a block diagram showing the hardware configuration of a numerical controller in outline constituting a controller according to the embodiment of the present invention.

A numerical controller 1 mainly includes a CPU 11, a ROM 12, a RAM 13, a CMOS 14, interfaces 15, 18 and 19, a PMC (Programmable Machine Controller) 16, an I/O unit 17, axis control circuits 30 to 34, servo amplifiers 40 to 44, a spindle control circuit 60 and a spindle amplifier 61.

The CPU 11 is a processor which performs overall control on the numerical controller 1. The CPU 11 reads, through a bus 20, a system program stored in the ROM 12 so as to control the entire numerical controller 1 according to the system program. In the ROM 12, various types of system programs for performing processing on an edition mode necessary for the production and edition of a machining program and processing for an automatic operation are previously written. In the RAM 13, temporary calculation data and display data and various types of data which are input by an operator through a display/MDI unit 70 are stored.

The CMOS memory 14 is configured as a non-volatile memory which is backed up by an unillustrated battery and in which even when the power supply of the numerical controller 1 is turned off, its memory state is held. In the CMOS memory 14, a machining program which is read through the interface 15, a machining program which is input through the display/MDI unit 70 and the like are stored.

Various types of machining programs such as a machining program for practicing the present invention are input through the interface 15 and the display/MDI unit 70 and can be stored in the CMOS memory 14.

The interface 15 makes it possible to connect together the numerical controller 1 and external equipment 72 such as an adaptor. From the side of the external equipment 72, a machining program, various types of parameters and the like are read. The machining program edited within the numerical controller 1 can be stored through the external equipment 72 in an external storage means.

The PMC (Programmable Machine Controller) 16 uses a sequence program incorporated in the numerical controller 1 so as to output a signal to an auxiliary device (for example, an actuator such as a robot hand for tool replacement) of a machine tool (machine) through the I/O unit 17 and thereby perform control. The PMC (Programmable Machine Controller) 16 also receives signals of various types of switches and the like in an operation panel provided in the main body of the machine tool, performs necessary signal processing and then feeds the signals to the CPU 11.

The display/MDI unit 70 is a manual data input device which includes a display, a keyboard and the like. The interface 18 receives a command or data from the keyboard of the display/MDI unit 70 and feeds it to the CPU 11. The interface 19 is connected to an operation panel 71 which includes a manual pulse generator and the like.

The axis control circuits 30 to 34 of the individual axes receive, from the CPU 11, the movement command amounts of the individual axes, and output the commands of the individual axes to the servo amplifiers 40 to 44.

The servo amplifiers 40 to 44 receive the commands so as to drive the servo motors 50 to 54 of the individual axes. The servo motors 50 to 54 of the individual axes incorporate position/speed detectors, feed back position/speed feedback signals from the position/speed detectors to the axis control circuits 30 to 34 and thereby perform feedback control on the position and the speed. In the block diagram, the position/speed feedback is omitted.

The spindle control circuit 60 receives a main axis rotation command to the machine tool so as to output a spindle speed signal to the spindle amplifier 61. The spindle amplifier 61 receives the spindle speed signal so as to rotate the spindle motor 62 of the machine tool at a commanded rotation speed and thereby drives a tool.

A pulse encoder 63 is coupled to the spindle motor 62 with a gear, a belt or the like. The pulse encoder 63 outputs a return pulse in synchronization with the rotation of the main axis. The return pulse is read via the bus 20 by the processor 11. The above-described hardware configuration of the numerical controller 1 is not restrictive but is given as an example.

2. Software Configuration of Numerical Controller

Figure 2:
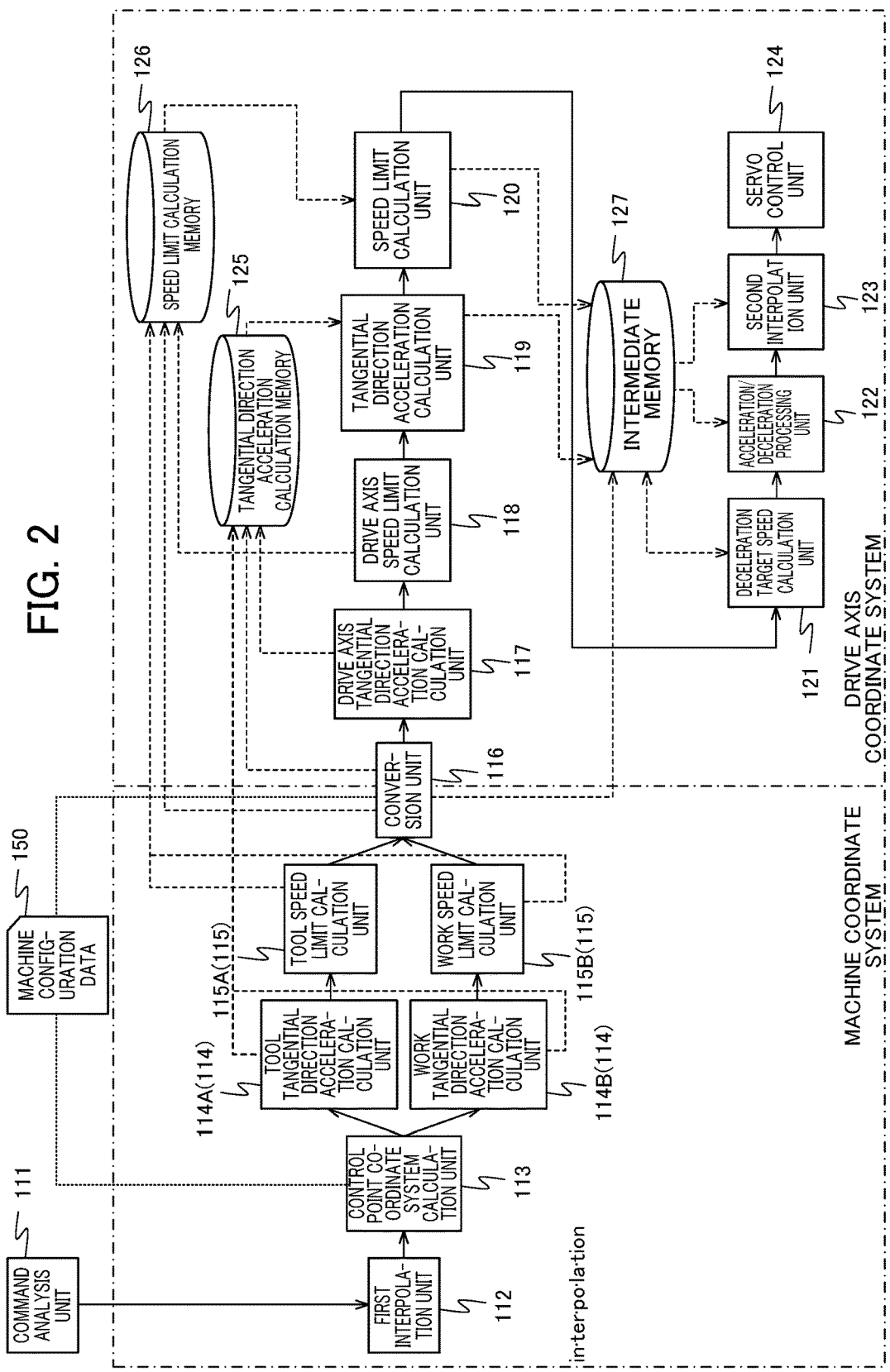
FIG. 2 shows the software configuration of the numerical controller according to the embodiment of the present invention.

The following describes functional processing specific to the present invention and performed by implementation of software processing inside the numerical controller. In this embodiment, a block configuration in terms of software can be described as follows as shown in FIG. 2. The numerical controller 1 includes a command analysis unit 111, a first interpolation unit 112, a control point coordinate system calculation unit 113, a control target tangential direction acceleration calculation unit 114, a control target speed limit calculation unit 115, a conversion unit 116, a drive axis tangential direction acceleration calculation unit 117, a drive axis speed limit calculation unit 118, a tangential direction acceleration calculation unit 119, a speed limit calculation unit 120, a deceleration target speed calculation unit 121, an acceleration/deceleration processing unit 122, a second interpolation unit 123, a servo control unit 124, a tangential direction acceleration calculation memory 125, a speed limit calculation memory 126, and an intermediate memory 127.

Examples of the control target tangential direction acceleration calculation unit 114 given herein include a tool tangential direction acceleration calculation unit 114A and a workpiece tangential direction acceleration calculation unit 114B. However, these are not the only examples. If a machine tool as a control target includes a movable camera, for example, the numerical controller 1 may further include a camera tangential direction acceleration calculation unit 114C (not shown in the drawings). Examples of the control target speed limit calculation unit 115 given herein include a tool speed limit calculation unit 115A and a workpiece speed limit calculation unit 115B. However, these are not the only examples. Like in the case described above, if a machine tool as a control target includes a movable camera, for example, the numerical controller 1 may further include a camera speed limit calculation unit 115C (not shown in the drawings).

The command analysis unit 111 analyzes a command program in a machine coordinate system, and converts the analyzed program to data to be used easily by the first interpolation unit 112.

The first interpolation unit 112 determines a point $P_t$ ($x_t$, $y_t$, $z_t$) on each command axis on a command route in the machine coordinate system at a first sampling cycle through interpolation calculation. Here, "t" is the number of times interpolation processing is performed by the first interpolation unit 112 and means interpolation performed for the t time by the first interpolation unit 112. The point $P_t$ ($x_t$, $y_t$, $z_t$) means a position of interpolation performed for the t time by the first interpolation unit 112. Like interpolation performed by a numerical controller for controlling a conventional machine generally having basic three axes X, Y, and Z, and three rotary axes A, B, and C, $P_t$ can be expressed as $P_t$ ($x_t$, $y_t$, $z_t$, $a_t$, $b_t$, $c_t$). For the convenience of description, however, only the basic three axes are used for expressing a coordinate.

The control point coordinate system calculation unit 113 expresses a machine configuration in a graph form based on the interpolation point $P_t$ ($x_t$, $y_t$, $z_t$) determined by the first interpolation unit 112 and using a method described in detail later, for example. By doing so, the control point coordinate system calculation unit 113 generates machine configuration data 150 reflecting an axis configuration for moving a tool or a workpiece. Further, the control point coordinate system calculation unit 113 calculates a control point position representing a tool position in the machine coordinate system and a coordinate system origin position representing a workpiece position in the machine coordinate system.

The tool tangential direction acceleration calculation unit 114A calculates tangential direction acceleration for the tool, and stores the calculated tangential direction acceleration into the tangential direction acceleration calculation memory 125. Likewise, the workpiece tangential direction acceleration calculation unit 114B calculates tangential direction acceleration for the workpiece, and stores the calculated tangential direction acceleration into the tangential direction acceleration calculation memory 125. The tangential direction acceleration is calculated by a method described in detail later.

The tool speed limit calculation unit 115A calculates speed limit for the tool based on maximum allowable speed, maximum allowable acceleration, and maximum allowable jerk, and stores the calculated speed limit into the speed limit calculation memory 126. Likewise, the workpiece speed limit calculation unit 1155 calculates speed limit for the workpiece based on maximum allowable speed, maximum allowable acceleration, and maximum allowable jerk, and stores the calculated speed limit into the speed limit calculation memory 126. The speed limit is calculated by a method described in detail later.

The conversion unit 116 sets a coordinate system representing the coordinate value of each drive axis as a drive axis coordinate system. The conversion unit 116 converts the position and the movement amount of a control point in the machine coordinate system and the position and the movement amount of a coordinate system origin in the machine coordinate system to a position and a movement amount in the drive axis coordinate system by using the machine configuration data 150. For this conversion, the conversion unit 116 stores a ratio between the movement amounts in the corresponding coordinate systems into the tangential direction acceleration calculation memory 125 and the speed limit calculation memory 126.

The drive axis tangential direction acceleration calculation unit 117 calculates tangential direction acceleration for the drive axis, and stores the calculated tangential direction acceleration into the tangential direction acceleration calculation memory 125. The tangential direction acceleration is calculated by a method described in detail later.

The drive axis speed limit calculation unit 118 calculates speed limit based on maximum allowable speed, maximum allowable acceleration, and maximum allowable jerk for the drive axis, and stores the calculated speed limit into the speed limit calculation memory 126. The speed limit is calculated by a method described in detail later.

The tangential direction acceleration calculation unit 119 calculates optimum tangential direction acceleration based on the tangential direction acceleration for the tool, the tangential direction acceleration for the workpiece, and the tangential direction acceleration for the drive axis stored in the tangential direction acceleration calculation memory 125, and stores the calculated optimum tangential direction acceleration into the intermediate memory 127. The optimum tangential direction acceleration is tangential direction acceleration used for calculation of deceleration target speed described later. Deceleration target speed is calculated an the drive axis coordinate system. Thus, the optimum tangential direction acceleration is also a quantity in the drive axis coordinate system. For example, the tangential direction acceleration calculation unit 119 multiplies each of the tangential direction acceleration for the tool and the tangential direction acceleration for the workpiece by the movement amount ratio determined during the conversion by the conversion unit 116, thereby converting each of the tangential direction acceleration for the tool and the tangential direction acceleration for the workpiece to a quantity in the drive axis coordinate system. Of these quantities resulting from the conversions and the tangential direction acceleration for the drive axis, lowest speed is adopted as tangential direction acceleration in the drive axis coordinate system. By doing so, the tangential direction acceleration for the tool in the machine coordinate system, the tangential direction acceleration for the workpiece in the machine coordinate system, and the tangential direction acceleration for the drive axis in the drive axis coordinate system can be controlled simultaneously so as not to exceed their maximum allowable accelerations.

The speed limit calculation unit 120 calculates optimum speed limit based on the speed limit for the tool, the speed limit for the workpiece, and the speed limit for the drive axis stored in the speed limit calculation memory 126, and stores the calculated optimum speed limit into the intermediate memory 127. The optimum speed limit is speed limit used for calculation of deceleration target speed described later. Deceleration target speed is calculated in the drive axis coordinate system. Thus, the optimum speed limit is also a quantity in the drive axis coordinate system. For example, the speed limit calculation unit 120 multiplies each of the tool speed limit and the workpiece speed limit by the movement amount ratio determined during the conversion by the conversion unit 116, thereby converting each of the tool speed limit and the workpiece speed limit to a quantity in the drive axis coordinate system. Of these quantities resulting from the conversions and the drive axis speed limit, lowest speed is adopted as drive axis coordinate system speed limit. By doing so, speed, acceleration, jerk for the tool in the machine coordinate system, those for the workpiece in the machine coordinate system, and those for the drive axis in the drive axis coordinate system can be controlled simultaneously so as not to exceed their maximum allowable speeds, maximum allowable accelerations, and maximum allowable jerks.

The deceleration target speed calculation unit 121 calculates speed as an intended deceleration result based on the optimum speed limit and the optimum tangential direction acceleration by using the well-known method described in patent document 1, for example. Then, the deceleration target speed calculation unit 121 stores the calculated speed into the intermediate memory 127.

The acceleration/deceleration processing unit 122 exerts acceleration/deceleration control based on the deceleration target speed stored in the intermediate memory 127 in such a manner that the speed of a control target becomes maximum speed not exceeding the deceleration target speed. Further, the acceleration/deceleration processing unit 122 calculates a movement amount in each second sampling cycle by using the well-known method described in patent document 1, for example, and outputs the calculated movement amount to the second interpolation unit 123.

The second interpolation unit 123 performs interpolation at the second sampling cycle based on the output from the acceleration/deceleration processing unit 122 and data retrieved from the intermediate memory 127 by using the well-known method described in patent document 1, for example. Further, the second interpolation unit 123 transmits an interpolation point in the drive axis coordinate system for the control target after implementation of the interpolation processing to the servo control unit 124.

The servo control unit 124 exerts servo control based on the interpolation point received from the second interpolation unit 123.

The tangential direction acceleration calculation memory 125 stores the tool tangential direction acceleration calculated by the tool tangential direction acceleration calculation unit 114A, the workpiece tangential direction acceleration calculated by the workpiece tangential direction acceleration calculation unit 114B, and the drive axis tangential direction acceleration calculated by the drive axis tangential direction acceleration calculation unit 117.

The speed limit calculation memory 126 stores the tool speed limit calculated by the tool speed limit calculation unit 115A, the workpiece speed limit calculated by the workpiece speed limit calculation unit 115B, and the drive axis speed limit calculated by the drive axis speed limit calculation unit 118.

The intermediate memory 127 stores the optimum tangential direction acceleration calculated by the tangential direction acceleration calculation unit 119, the optimum speed limit calculated by the speed limit calculation unit 120, and the deceleration target speed calculated by the deceleration target speed calculation unit 121.

3. Machine Configuration Data

Prior to filing of the present application, the applicant of the present application filed Japanese Patent Application No. 2016-240446 relating to a numerical controller which expresses the machine configuration of a control target in a graph form and which holds it. The numerical controller 1 of the present invention is allowed to generate the above-described machine configuration data, and calculate a control point position representing a tool position in the machine coordinate system and a coordinate system origin position representing a workpiece position in the machine coordinate system by employing the same method as in the previously-filed application. This method will be described in outline by referring to FIGS. 3 to 9.

Figure 3:
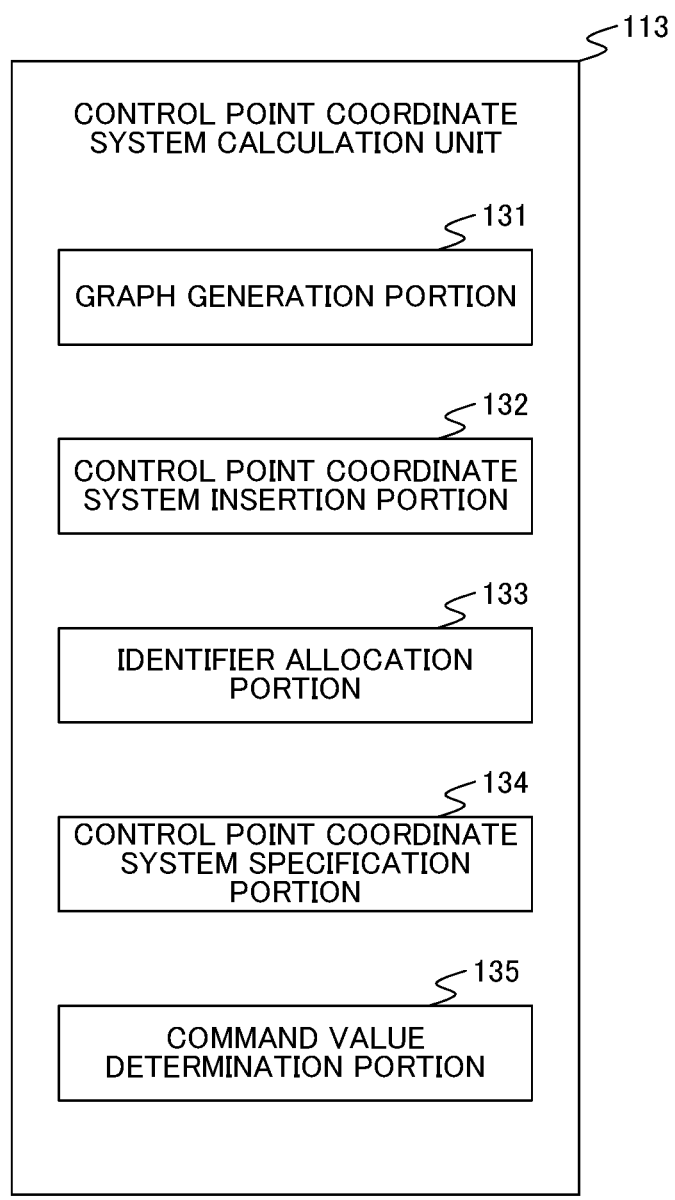
FIG. 3 is a functional block diagram about a control point coordinate system calculation unit according to the embodiment of the present invention.

FIG. 3 is a block diagram showing the functional block of the control point coordinate system calculation unit 113. The control point coordinate system calculation unit 113 includes a graph generation portion 131, a control point coordinate system insertion portion 132, an identifier allocation portion 133, a control point coordinate system specification portion 134, and a command value determination portion 135. The graph generation portion 131 generates the machine configuration of a control target in a graph form. The control point coordinate system insertion portion 132 inserts a control point and a coordinate system into the graph of the machine configuration. The identifier allocation portion 133 allocates an identifier to each of the control point and the coordinate system. The control point coordinate system specification portion 134 specifies, with the identifiers, the control point and the coordinate system. Specifically, the control point coordinate system specification portion 134 uses, for example, any one of a command in a program, a parameter setting, a screen operation and an input value from an input means to the numerical controller 1 so as to specify the control point and the coordinate system. The command value determination portion 135 determines for which control point and on which coordinate system the command value in the program is a coordinate value.

Figure 4:
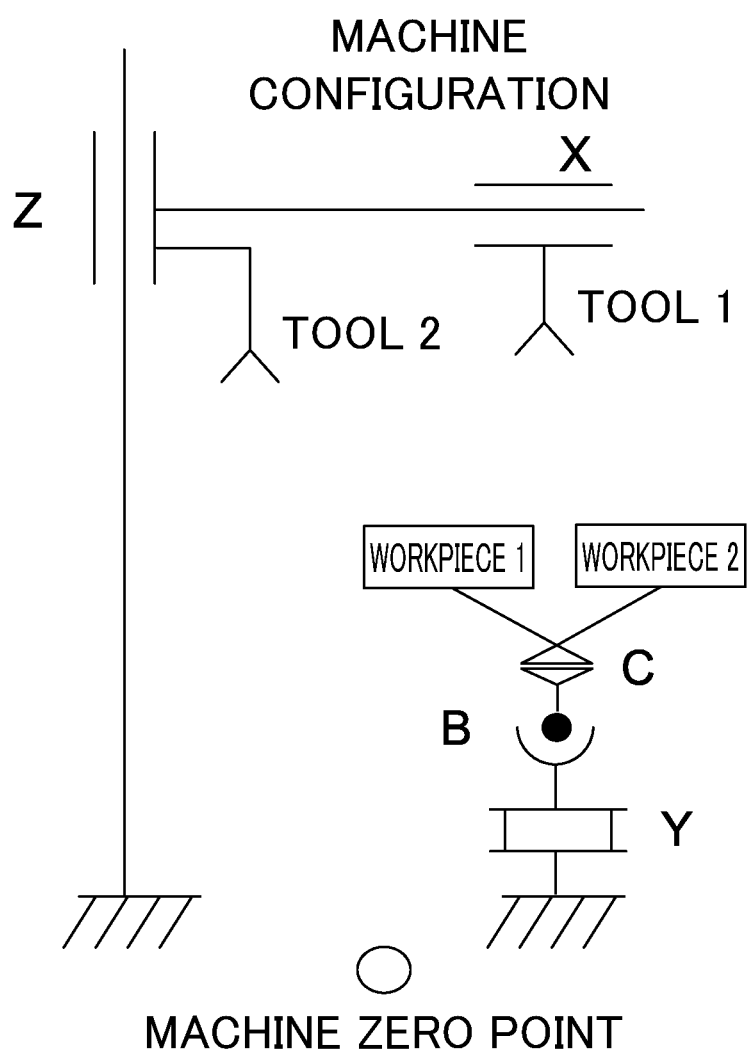
FIG. 4 shows an exemplary configuration of a machine for which a machine configuration tree is generated by the control point coordinate system calculation unit according to the embodiment of the present invention.

As the example, the method of generating the machine configuration tree expressing the configuration of a machine shown in FIG. 4 will be described. In the machine of FIG. 4, it is assumed that an X axis is set perpendicular to a Z axis, that a tool 1 is installed in the X axis and that a tool 2 is installed in the Z axis. On the other hand, it is assumed that a B axis is set on a Y axis, that a C axis is set on the B axis and that a workpiece 1 and a workpiece 2 are installed in the C axis. The method of expressing the machine configuration as the machine configuration tree will be described below.

Figure 5:
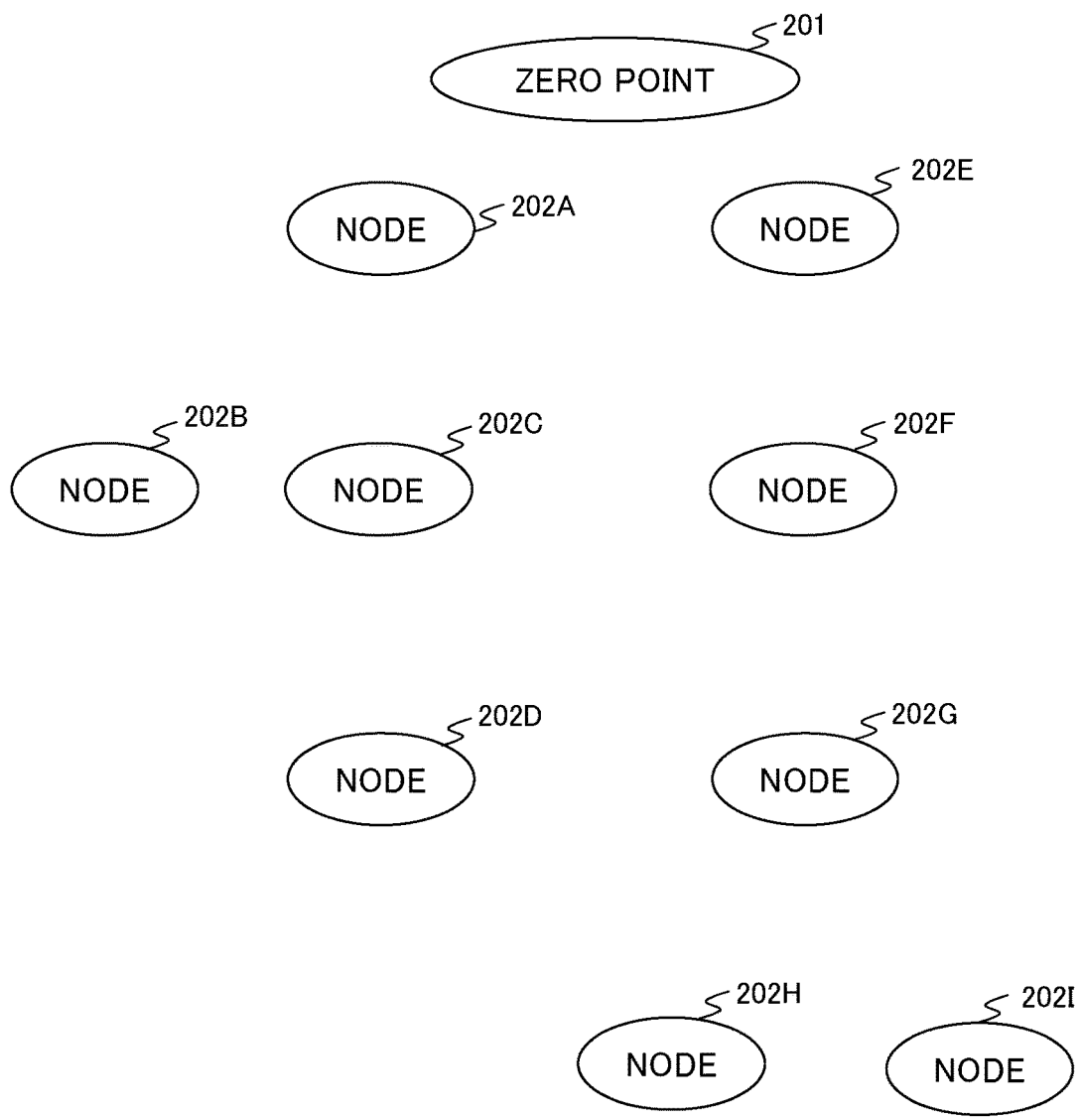
FIG. 5 shows an example of the machine configuration tree generated by the control point coordinate system calculation unit according to the embodiment of the present invention.

First, as shown in FIG. 5, only a zero point 201 and nodes 202A to 202G are arranged. In this stage, there is no connection between the zero point 201 and the node 202 and between the nodes 202, and the names of the zero point and the nodes are not set.

Figure 6:
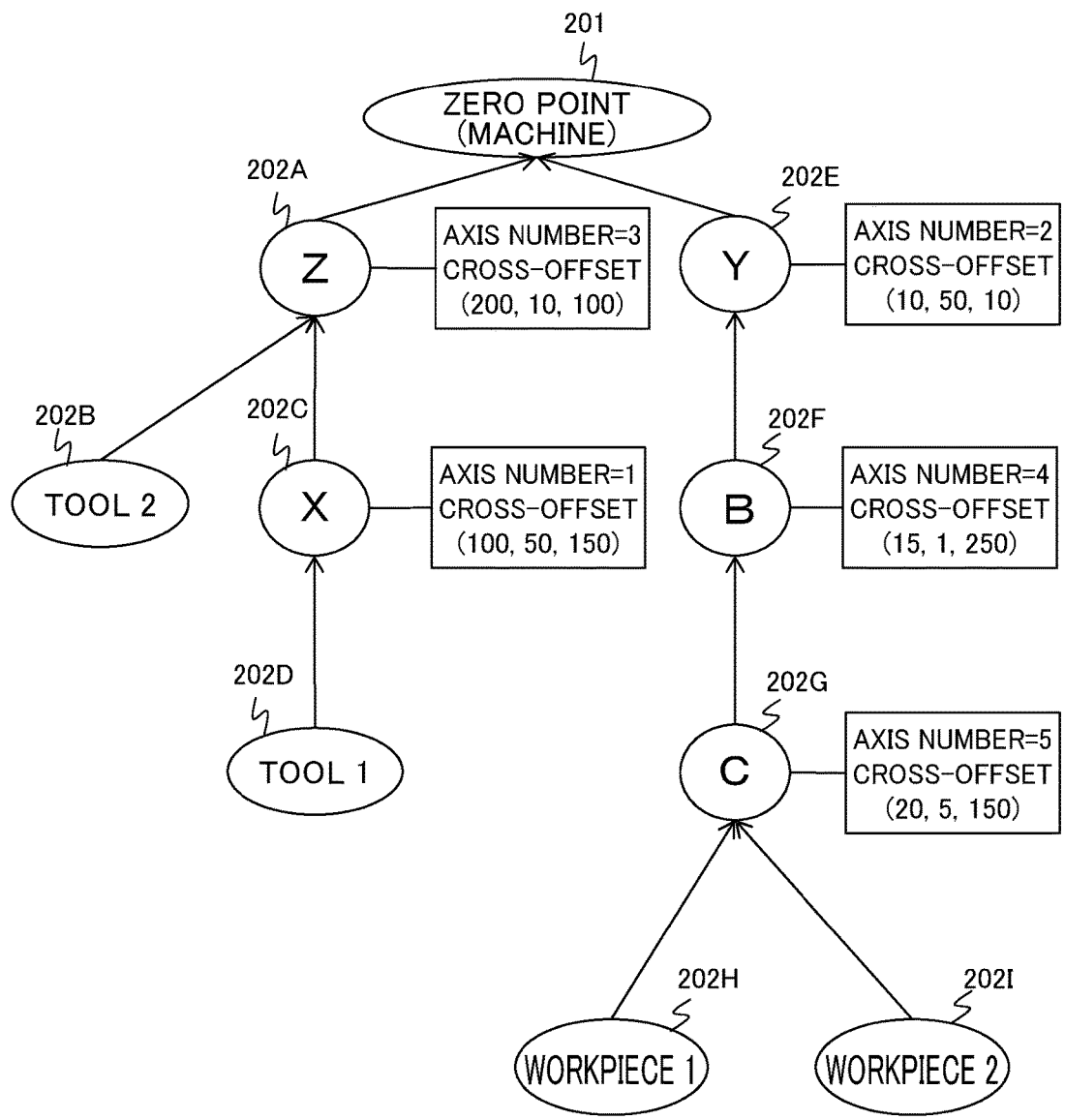
FIG. 6 shows an example of the machine configuration tree generated by the control point coordinate system calculation unit according to the embodiment of the present invention.

Then, the axis names (axis types) of the individual axes, the names of the individual tools, the names of the individual workpieces, the names of the individual zero points and the physical axis numbers (axis types) of the individual axes are set. Then, the parent nodes (axis types) of the individual axes, the parent nodes of the individual tools and the parent nodes of the individual workpieces are set. Finally, the cross-offsets (axis types) of the individual axes, the cross-offsets of the individual tools and the cross-offsets of the individual workpieces are set. Consequently, the machine configuration tree shown in FIG. 6 is generated.

Each node of the machine configuration tree is not limited to the pieces of information described above, and it may or may not have information related to, for example, the identifier (name), the identifier of the parent node of itself, the identifiers of all child nodes whose parents are itself, an relative offset (cross-offset) with respect to the parent node, a relative coordinate value with respect to the parent node, a relative movement direction (unit vector) with respect to the parent node, node types (linear axis/rotary axis/unit (which will be described later)/control point/coordinate system/zero point and the like), the physical axis number and the transformation formulas of an orthogonal coordinate system and a physical coordinate system.

As described above, values are set to the individual nodes, and thus data which has a data structure in the shape of a machine configuration tree is generated within the numerical controller 1. Furthermore, even when another machine (or robot) is added, a zero point is added, and thus it is possible to further add nodes.

Figure 7:
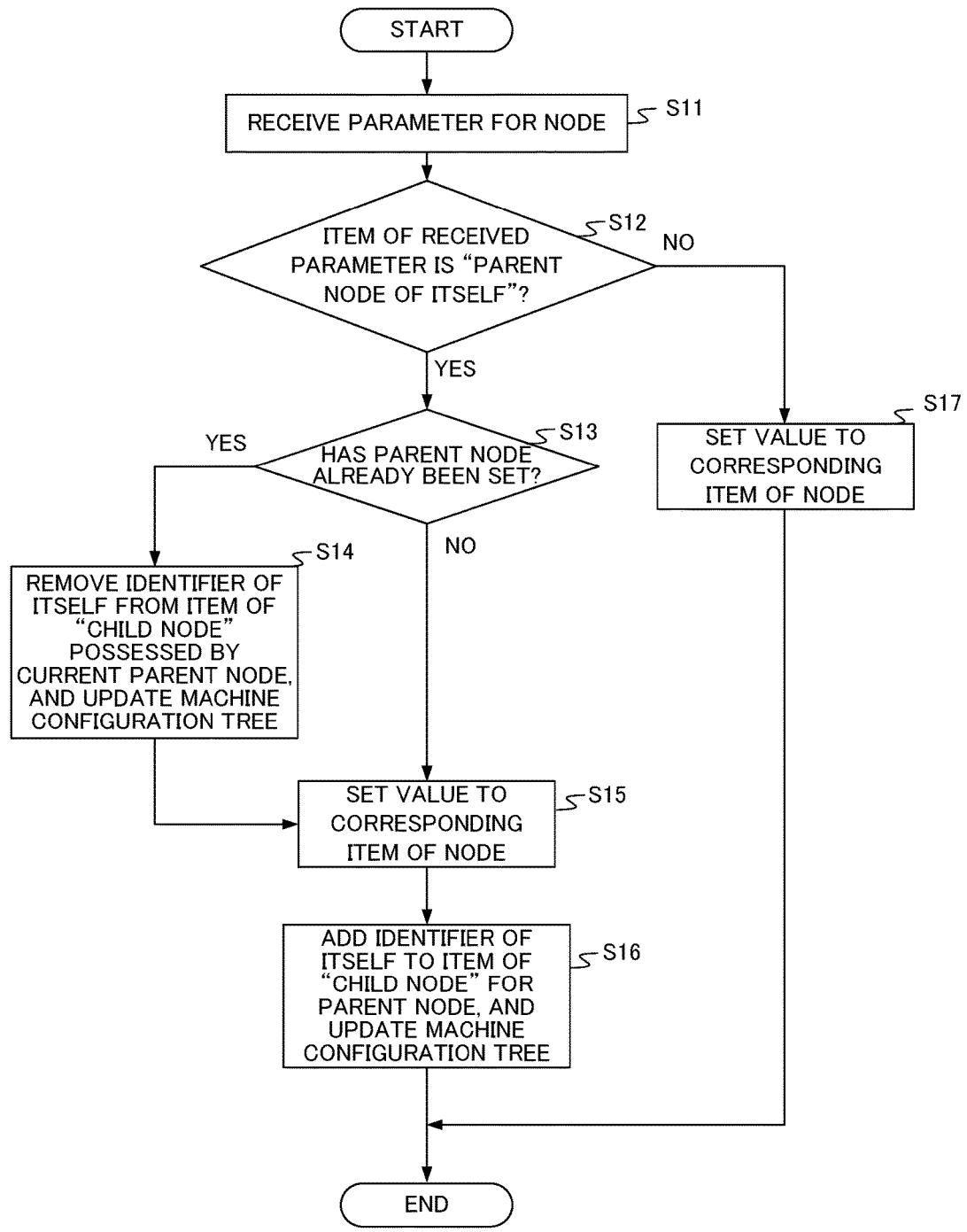
FIG. 7 is an explanatory view of a method of generating a machine configuration tree by the control point coordinate system calculation unit according to the embodiment of the present invention.

A flowchart obtained by generalizing the method of venerating the machine configuration tree described above, in particular, the method of setting the values to the nodes is shown in FIG. 7.

In step S11, the graph generation portion 131 receives the value of a parameter set to the node. When in step S12, the item of the set parameter is "parent node of itself" (YES in S12), the processing is transferred to step S13. When the item of the set parameter is not "parent node of itself" (NO in S12), the processing is transferred to step S17.

When in step S13, a parent node has already been set to the node to which the parameter is set (YES in S13), the processing is transferred to step S14. When a parent node has not been set (NO in S13), the processing is transferred to step S15.

In step S14, the graph generation portion 131 deletes the identifier of itself from the item of "child node" possessed by the current parent node of the node to which the parameter is set so as to update the machine configuration tree.

In step S15, the graph generation portion 131 sets the value to the corresponding item of the node to which the parameter is set.

In step S16, the graph generation portion 131 adds the identifier of itself to the item of "child node" in the parent node so as to update the machine configuration tree, and thereafter the flow is completed.

In step S17, the graph generation portion 131 sets the value to the corresponding item of the node to which the parameter is set, and thereafter the flow is completed.

Figure 8:
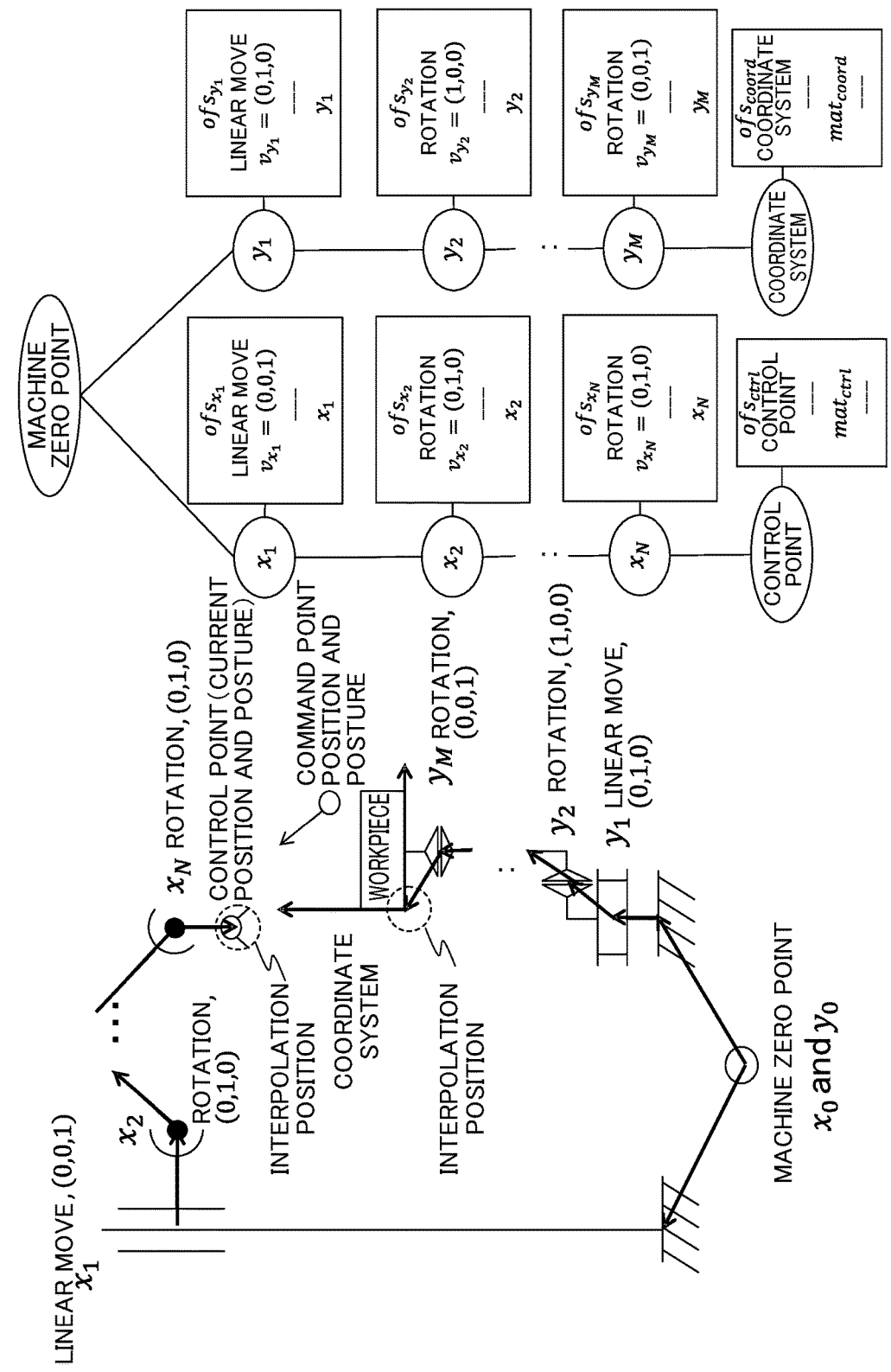
FIG. 8 shows an exemplary configuration of a machine for which a machine configuration tree is generated by the control point coordinate system calculation unit according to the embodiment of the present invention and an example of the corresponding machine configuration tree.

For example, as shown on the left side of FIG. 8, is assumed that an axis x2 is set on an axis x1, that an axis x3 is set on the axis x2, that then, N nodes are likewise continuous and that the end thereof is an axis xN. Furthermore, it is assumed that on the axis xN, a control point is installed. Likewise, it is assumed that an axis y2 it set on an axis y1, that an axis y3 is set on the axis y2, that then, L nodes are likewise continuous and that the end thereof is an axis yL. Furthermore, it is assumed that on the axis yL, a workpiece is installed. Here, although xi and yi are the names of nodes, it is assumed that they simultaneously indicate the coordinate values of the individual nodes. Regarding a note "straightforward, (0, 0, 1)" given to x1, for example, this note indicates that x1 is a node to make straightforward movement in a direction (X, Y, Z)=(0, 0, 1). A configuration tree shown on the right side of FIG. 8 is a machine configuration tree reflecting the above-described machine configuration. In this configuration tree, of $s_{x1}$ represents an offset value of the node x1, for example. The control point coordinate system calculation unit 113 calculates a control point position representing a tool position in the machine coordinate system, a coordinate origin representing a workpiece position in the machine coordinate system, and each interpolation position represented by a dotted circle in the machine configuration diagram.

Figure 9:
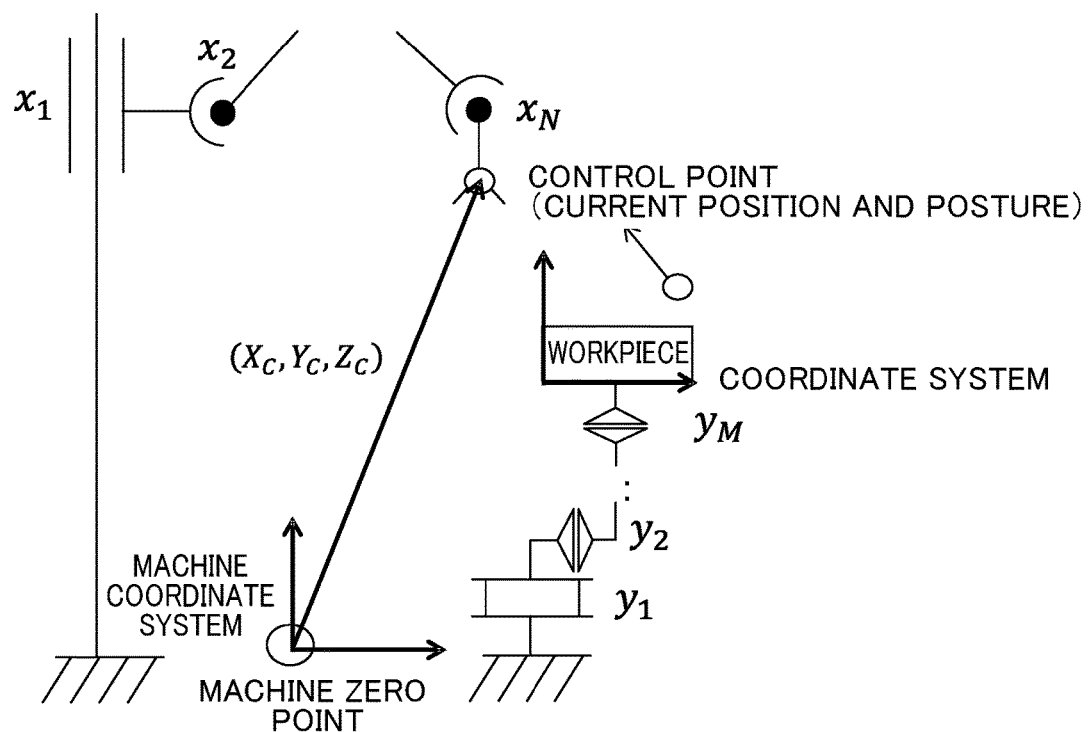
FIG. 9 is an explanatory view of the current position of a control point in an orthogonal coordinate system according to the embodiment of the present invention.

As shown in FIG. 9, the current position of a control point (Xc, Yc, Zc) in the machine coordinate system can be obtained by the following formula (1), for example.

[Math. 1]

$$(X_c, Y_c, Z_c) = \{\Pi_{i=1}^{N} T(ofs_{x_i}) S(x_i, d_{x_i}, v_{x_i})\} ofs_{ctrl} \quad (1)$$

In this formula, T(ofs) is a translation matrix corresponding to an offset, S (x, straightforward, v) is a translation matrix representing movement by x in a direction v, and S (x, rotation, v) is a rotation matrix representing rotation by x about the direction v, and $ofs_{ctrl}$ is an offset at a control point. The coordinate $(x_t, y_t, z_t)$ of an interpolation point in the machine coordinate system can also be calculated by using the formula (1).

4. Speed Limit and Allowable Tangential Direction Acceleration

For example, the method described in patent document 1 can be used by the tool tangential direction acceleration calculation unit 114A and the workpiece tangential direction acceleration calculation unit 114B for calculating tangential direction accelerations, by the tool speed limit calculation unit 115A and the workpiece speed limit calculation unit 115E for calculating speed limits, by the drive axis tangential direction acceleration calculation unit 117 for calculating tangential direction acceleration, and by the drive axis speed limit calculation unit 118 for calculating speed limit. This method will be described in outline by referring to FIG. 10.

A first interpolation movement amount $L_t$ in a sampling cycle T1 can be determined through calculation using the following formula (2) based on the coordinate $(x_t, y_t, z_t)$ of an interpolation point calculated by the control point, coordinate system calculation unit 113.

$$L_t = \{(x_t - x_{t-1})^2 + (y_t - y_{t-1})^2 + (z_t - z_{t-1})^2\}^{1/2} \quad (2)$$

Speed $V_t$ ($vx_t$, $vy_t$, $vz_t$) for a corresponding axis of a control target in the machine coordinate system is calculated through calculation using any of the following formulas (3-1) to (3-3) based on the interpolation position $(x_t, y_t, z_t)$ and the first interpolation sampling cycle T1.

$$vx_t = (x_t - x_{t-1})/T1 \quad (3-1)$$

$$vy_t = (y_t - y_{t-1})/T1 \quad (3-2)$$

$$vz_t = (z_t - z_{t-1})/T1 \quad (3-3)$$

Acceleration $A_t$ ($ax_t$, $ay_t$, $az_t$) for a corresponding axis of the control target in the machine coordinate system is calculated through calculation using any of the following formulas (4-1) to (4-3) based on the speed $V_t$ ($vx_t$, $vy_t$, $vz_t$) for the corresponding axis obtained by any of the formulas (3-1) to and the first sampling cycle T1.

$$ax_t = (vx_t - vx_{t-1})/T1 \quad (4-1)$$

$$ay_t = (vy_t - vy_{t-1})/T1 \quad (4-2)$$

$$az_t = (vz_t - vz_{t-1})/T^1 \quad (4-3)$$

Jerk $j_t$ ($jx_t$, $jy_t$, $jz_t$), which is a temporal differentiation of acceleration for a corresponding axis of the control target in the machine coordinate, is calculated through calculation using any of the following formulas (5-4) to (5-3) based on the acceleration $A_t$ ($ax_t$, $ay_t$, $az_t$) obtained by any of the formulas (4-1) to (4-3) and the first sampling cycle T1.

$$jx_t = (ax_t - ax_{t-1})/T1 \quad (5-1)$$

$$jy_t = (ay_t - ay_{t-1})/T1 \quad (5-2)$$

$$jz_t = (az_t - az_{t-1})/T1 \quad (5-3)$$

Figure 10:
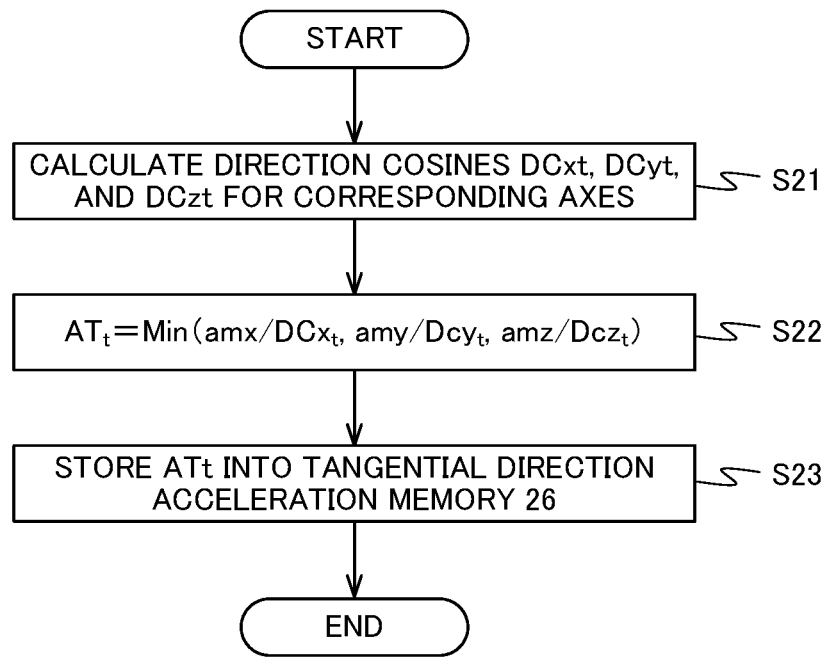
FIG. 10 shows a method of calculating tangential direction acceleration according to the embodiment of the present invention.
Figure 11A:
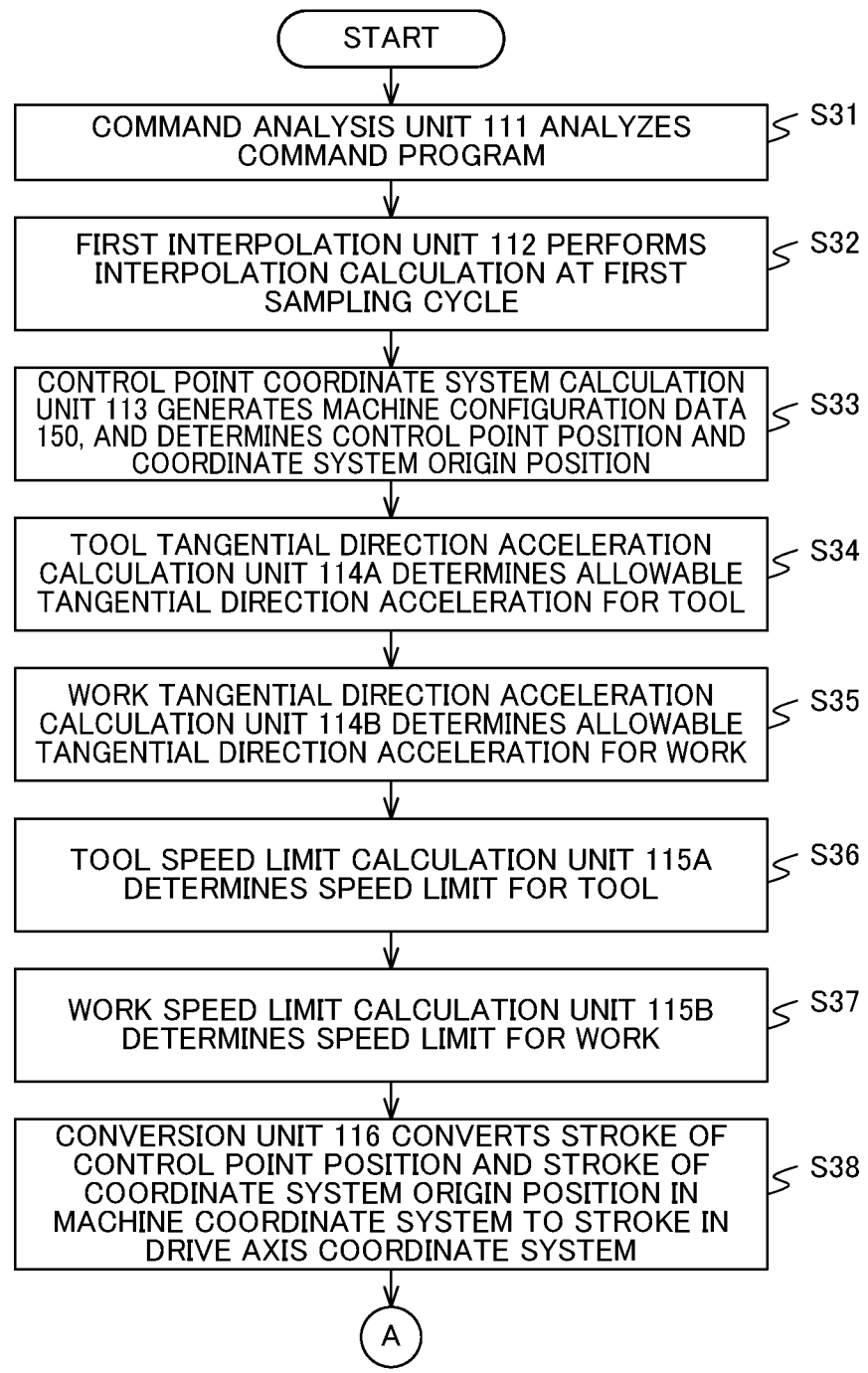
FIG. 11A explains a flow of the operation of the numerical controller according to the embodiment of the present invention.
Figure 11B:
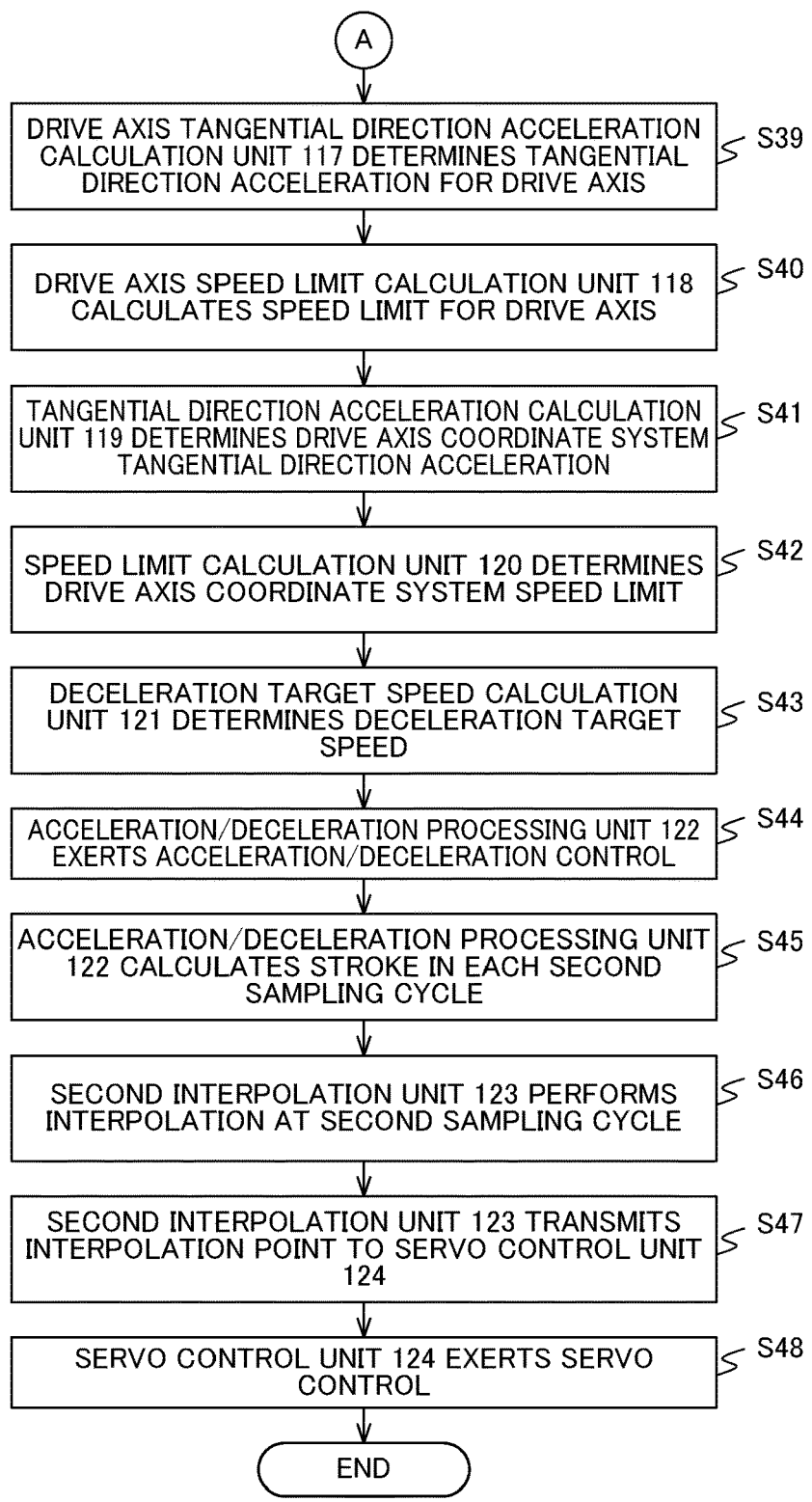
FIG. 11B explains the flow of the operation of the numerical controller according to the embodiment of the present invention.

FIG. 10 is a flowchart showing a procedure of calculating optimum tangential direction acceleration by the tool tangential direction acceleration calculation unit 114A based on the coordinate value $(x_t, y_t, z_t)$ of a tool as a control target in the machine coordinate system, and maximum allowable accelerations amx, amy, and amz for corresponding axes. The following describes a procedure of calculating optimum allowable tangential direction acceleration $AT_t$ based on this flowchart.

In step S21 of FIG. 10, a movement amount for each axis (corresponding to one segment) is calculated based on position data $(x_t, y_t, z_t)$ (t=0, 1, . . . ). Further, direction cosines DCx, DCy, and DCz for corresponding axes are calculated. In this case, the direction cosine DCx is the cosine of an angle formed between a movement direction vector resulting from combination of one segment for the X axis (vector composition), specifically, a composite tangential direction vector and the X axis. Thus, t-th data (t=1, 2, . . . ) about DCx is obtained as follows:

$$DCx_t = |x_t - x_{t-1}|/L_t \quad (6)$$

In this formula, $L_t$ represents a composite movement amount in the machine coordinate system in each first sampling cycle.

Likewise, the direction cosine DCy is the cosine of an angle formed between a direction vector resulting from combination of one segment for the Y axis (composite tangential direction vector) and the Y axis. Further, the direction cosine DCz is the cosine of an angle formed between a direction vector resulting from combination of one segment for the Z axis (composite tangential direction vector) and the Z axis. Acceleration in the movement directions represented by the above-described direction vectors (specifically, composite tangential direction acceleration) AW is required to satisfy the following conditions for all the axes:

$$AW \times DCx_t \leq amx \quad (7\text{-}1)$$

$$AW \times DCy_t \leq amy \quad (7\text{-}2)$$

$$AW \times DCz_t \leq amz \quad (7\text{-}3)$$

In these formulas, amx is maximum allowable acceleration for the X axis, amy is maximum allowable acceleration for the Y axis, and amz is maximum allowable acceleration for the Z axis.

In step S22, the optimum tangential direction acceleration $AT_t$ (t=1, 2, . . . ) is calculated using a result obtained in step S21. The optimum tangential direction acceleration $AT_t$ is calculated so as to have a largest value within a range not breaking the above-described conditions defining that tangential direction accelerations for corresponding axes should fail below their maximum allowable accelerations. This calculation means finding a minimum out of ami/DCi (i=x, y, z), specifically, finding Min{ami/DCi} (i=x, y, z). Specifically, the following relationship is established:

$$AT_t = \text{Min}\{ami/DCi_t\} \ (i=x,y,z)(t=1,2, \ldots) \quad (8).$$

In subsequent step S23, the determined optimum tangential direction acceleration $AT_t$ is stored into the tangential direction acceleration calculation memory 125. The foregoing procedure also applies to the workpiece tangential direction acceleration calculation unit 114B.

The tool speed limit calculation unit 115A calculates speed limit $RF_t$ responsive to the interpolation point ($x_t$, $y_t$, $z_t$) (t=1, 2, . . . ) in the machine coordinate system based on data in the speed limit calculation memory 126, and writes the calculated speed limit $RF_t$ into the speed limit calculation memory 126.

The speed limit $RF_t$ is speed of each segment in a composite tangential direction. The speed limit $RF_t$ is limited so as not to exceed a maximum allowance of speed, that of acceleration, and that of jerk for each axis at the position ($x_t$, $y_t$, $z_t$) (t=1, 2, . . . ). Specifically, a maximum allowance is set for each of speed, acceleration, and jerk for each axis. Assuming that a maximum allowance of speed is VM (vmx, vmy, vmz), a maximum allowance of acceleration is AM (amx, amy, amz), and a maximum allowance of jerk is JM (jmx, jmy, jmz), the speed limit $RF_t$ is speed of each movement amount in the composite tangential direction that prohibits speed, acceleration, and jerk for each axis from exceeding their maximum allowances in each first sampling cycle.

Speed for each segment in the composite tangential direction, determined by data output from the control point coordinate system calculation unit 113, is expressed as $L_t/T1$. Thus, calculating the speed limit $RF_t$ means calculating the speed limit $RF_t$ (t=1, 2, . . . ) of each segment in the composite tangential direction that prohibits speed, acceleration, and jerk for each axis from exceeding their maximum allowances by processing the speed $L_t/T1$ in the following way. The calculated speed limit $RF_t$ (t=1, 2, . . . ) is output to the speed limit calculation memory 126.

$$KV = \text{Min}(vmx/vx_t, vmy/vy_t, vmz/vz_t) \quad (9)$$

The formula (9) means that KV is to take a value smallest in the brackets on the right side. If the right side is 1 or more, KV becomes "1."

$$KA = \text{Min}(amx/ax_t, amy/ay_t, amz/az_t) \quad (10)$$

Like the formula (9), the formula (10) means that KA is to take a value smallest in the brackets on the right side. If the right side is 1 or more, KA becomes "1."

$$KJ = \text{Min}(jmx/jx_t, jmy/jy_t, jmz/jz_t) \quad (11)$$

Like the formula (9), the formula (11) means that KJ is to take a value smallest in the brackets on the right side. If the right side is 1 or more, KJ becomes "1."

$$RF_t = \text{Min}(KV, KA, KJ) \times L_t/T1 \quad (12)$$

Like the formula (9), the formula (12) also means that Min (KV, KA, KJ) is a smallest value among KV, KA, and KJ.

The formulas (9) to (11), and Min (KV, MA, KJ) in the formula (12) mean that a value smallest among the following values is to be selected: a ratio of maximum allowable speed to speed, a ratio of maximum allowable acceleration to acceleration, and a ratio of maximum allowable jerk to jerk. This also means that one of the speed, the acceleration, and the jerk calculated through the calculations using the formulas (3-1) to (3-3), (4-1) to (4-3), and (5-1) to (5-3) is selected which is largest relative to the maximum allowance of speed, the maximum allowance of acceleration, and the maximum allowance of jerk for each of the X axis, the Y axis, and the Z axis.

It is assumed, for example, that "vmx/vx$_t$" has a smallest value. This means that speed for the X axis exceeds the maximum allowance relatively most largely. In the above-described formula (12), Min (KV, KA, KJ) is determined to be "vmx/vx$_t$." As a result, the speed limit $RF_t$ is determined as follows: $RF_t = (vm1/vx_t) \times L_t/T1$. At the speed "$L_t/T1$," speed for the X axis is determined to be vx$_t$. Thus, the speed limit $RF_t$ having proportional relationship is obtained as follows:

$$(L_t/T1)/vx_t = RF_t/(\text{speed for } X \text{ axis}) \quad (13)$$

$$(\text{Speed for } X \text{ axis}) = RF_t \times vx_t/(L_t/T1) = [(vmx/vx_t) \times L_t/T1]/(L_t/T1) = vm1 \quad (14).$$

By employing this speed limit $RF_t$, the speed for the X axis exceeding the maximum allowance most largely is limited to allowable speed. The speed limit $RF_L$ is obtained by selecting the smallest value using Min (KV, KA, KJ). Thus, a different element for a corresponding different drive axis is to fall within a maximum allowance in terms of each of speed, acceleration, and jerk.

The speed limit $RF_t$ is obtained through the calculations using the formulas (9) to (12) described above, and then stored into the speed limit calculation memory 126. The foregoing procedure also applies to the workpiece speed limit calculation unit 115B.

In this embodiment, the speed limit $RF_t$ is calculated in such a manner that all of speed, acceleration, and jerk in the mechanical coordinate system (X axis, Y axis, and Z axis) do not exceed their maximum allowances. Alternatively, the speed limit $RF_t$ may be calculated based on one, or a combination of any two of speed, acceleration, and jerk. If only speed is to be limited within an allowance, for example, Min (KV, KA, KJ) in the formula (12) becomes "KV." If only acceleration is to be limited within an allowance, for example, Min (KV, KA, KJ) in the formula (12) becomes "KA."

If speed and acceleration are to be limited within their allowances, for example, Min (KV, KA, KJ) in the formula (12) becomes "Min (KV, KA)."

The above-described method is also employed by the drive axis speed limit calculation unit 118 for calculating speed limit, and by the drive axis tangential direction acceleration calculation unit 117 for calculating allowable tangential direction acceleration. More specifically, based on the coordinate ($x_t$, $y_t$, $z_t$) of the interpolation point (t=0, 1, 2, ...) calculated by the control point coordinate system calculation unit 113, the conversion unit 116 may obtain a position $U_t$ ($u1_t$, $u2_t$, $u3_t$) for a corresponding drive axis through reverse mechanism conversion. The resultant $U_t$ may be processed by the same method to calculate speed limit and allowable tangential direction acceleration.

5. Operation of Numerical Controller

As already described in [2. Software configuration of numerical controller], the operation of the numerical controller 1 will be described in detail by referring to a flowchart shown in FIGS. 11A and 11B.

In step S31, the command analysis unit 111 analyzes a command program in a machine coordinate system, and converts the analyzed program to data to be used easily by the first interpolation unit 112.

In step S32, the first interpolation unit 112 determines the point $P_t$ ($x_t$, $y_t$, $z_t$) on each command axis on a command route in the machine coordinate system at the first sampling cycle through interpolation calculation.

In step S33, the control point coordinate system calculation unit 113 generates the machine configuration data 150 based on the interpolation point $P_t$ ($x_t$, $y_t$, $z_t$) determined by the first interpolation unit 112. Further, the control point coordinate system calculation unit 113 calculates a control point position representing a tool position in the machine coordinate system and a coordinate system origin position representing a workpiece position in the machine coordinate system.

In step S34, the tool tangential direction acceleration calculation unit 114A calculates tangential direction acceleration for a tool, and stores the calculated tangential direction acceleration into the tangential direction acceleration calculation memory 125.

In step S35, the workpiece tangential direction acceleration calculation unit 114B calculates tangential direction acceleration for a workpiece, and stores the calculated tangential direction acceleration into the tangential direction acceleration calculation memory 125.

In step S36, the tool speed limit calculation unit 115A calculates speed limit for the tool based on maximum allowable speed, maximum allowable acceleration, and maximum allowable jerk, and stores the calculated speed limit into the speed limit calculation memory 126.

In step S37, the workpiece speed limit calculation unit 115B calculates speed limit for the workpiece based on maximum allowable speed, maximum allowable acceleration, and maximum allowable jerk, and stores the calculated speed limit into the speed limit calculation memory 126.

In step S38, the conversion unit 116 sets a coordinate system representing the coordinate value of each drive axis as a drive axis coordinate system. Further, the conversion unit 116 converts the position and the movement amount of a control point in the machine coordinate system and the position and the movement amount of a coordinate system origin in the machine coordinate system to a position and a movement amount in the drive axis coordinate system by using the machine configuration data 150.

In step S39, the drive axis tangential direction acceleration calculation unit 117 calculates tangential direction acceleration for the drive axis, and stores the calculated tangential direction acceleration into the tangential direction acceleration calculation memory 125.

In step S40, the drive axis speed limit calculation unit 118 calculates speed limit based on maximum allowable speed, maximum allowable acceleration, and maximum allowable jerk for the drive axis, and stores the calculated speed limit into the speed limit calculation memory 126.

In step S41, the tangential direction acceleration calculation unit 119 calculates optimum tangential direction acceleration based on the tangential direction acceleration for the tool, the tangential direction acceleration for the workpiece, and the tangential direction acceleration for the drive axis stored in the tangential direction acceleration calculation memory 125, and stores the calculated optimum tangential direction acceleration into the intermediate memory 127.

In step S42, the speed limit calculation unit 120 calculates optimum speed limit based on the speed limit for the tool, the speed limit for the workpiece, and the speed limit for the drive axis stored in the speed limit calculation memory 126, and stores the calculated optimum speed limit into the intermediate memory 127.

In step S43, the deceleration target speed calculation unit 121 calculates deceleration target speed as a deceleration result intended to be achieved by a control target based on the optimum tangential direction acceleration and the optimum speed limit, and stores the calculated deceleration target speed into the intermediate memory 127.

In step S44, the acceleration/deceleration processing unit 122 exerts acceleration/deceleration control based on the deceleration target speed stored in the intermediate memory 127.

In step S45, the acceleration/deceleration processing unit 122 calculates a movement amount in each second sampling cycle, and outputs the calculated movement amount to the second interpolation unit 123.

In step S46, the second interpolation unit 123 performs interpolation at the second sampling cycle based on the output from the acceleration/deceleration processing unit 122 and data retrieved from the intermediate memory 127.

In step S47, the second interpolation unit 123 transmits an interpolation point in the drive axis coordinate system for the control target after implementation of the interpolation processing to the servo control unit 124.

In step S48, the servo control unit 124 exerts servo control based on the interpolation point received from the second interpolation unit 123.

6. Effect

The numerical controller 1 described above becomes capable of exerting acceleration/deceleration control more accurately than has been exerted conventionally. Further, the present invention becomes capable of reducing the occurrence of shock in a machine coordinate system and shortening cycle time by making optimum settings.

Tangential direction acceleration and speed limit are calculated for each control target. By doing so, a tool and a workpiece can be subjected to acceleration/deceleration control separately. In this case, the tool and the workpiece are subjected to acceleration/deceleration control based on respective set values, so that acceleration/deceleration control can be exerted more accurately.

The control point coordinate system calculation unit sets machine configuration data reflecting an axis configuration, and calculates the coordinate value of a control target in an orthogonal coordinate system. By doing so, based on the machine configuration data in a graph form, for example, maximum allowable speed, maximum allowable acceleration, and maximum allowable jerk can be set in each of the orthogonal coordinate system (machine coordinate system) and a drive axis coordinate system. Additionally, both a tool and a workpiece can be subjected to control in the orthogonal coordinate system (machine coordinate system).

7. Other Embodiments

In the above-described embodiment, the control point coordinate system calculation unit 113 expresses a machine configuration in a graph form to generate the machine configuration data 150 reflecting an axis configuration for moving a tool or a workpiece. Further, the control point coordinate system calculation unit 113 calculates a control point position representing a tool position in a machine coordinate system and a coordinate system origin position representing a workpiece position in the machine coordinate system. However, this is not the only case. For example, the machine configuration data 150 may be replaced by a formula about a relationship between a machine coordinate system and a drive axis coordinate system such as that shown in FIG. 12B.

In the above-described embodiment, a coordinate value in an orthogonal coordinate system (machine coordinate system) is calculated for each of a tool and a workpiece, and then acceleration/deceleration control is exerted. However, this is not the only case. More specifically, the coordinate of the tool relative to the workpiece or the coordinate of the workpiece relative to the tool may be used for acceleration/deceleration control.

In the above-described embodiment, the control target tangential direction acceleration calculation unit 114 calculates tangential direction acceleration for a control target based on maximum allowable acceleration for the control target. The drive axis tangential direction acceleration calculation unit 117 calculates tangential direction acceleration for a drive axis based on maximum allowable acceleration for the drive axis. However, this is not the only case. Each of the control target tangential direction acceleration calculation unit 114 and the drive axis tangential direction acceleration calculation unit 117 may calculate jerk in a tangential direction or may calculate a physical quantity by differentiating the position of a control target with respect to time three times or more based on a maximum allowance of the jerk or a maximum allowance of the physical quantity calculated by differentiating the position with respect to time three times or more, in addition to maximum allowable acceleration. Each of the control target speed limit calculation unit 115 and the drive axis speed limit calculation unit 118 may calculate speed limit based on a maximum allowance of jerk or a maximum allowance of a physical quantity calculated by differentiating the position or a control target with respect to time three times or more, in addition to maximum allowable acceleration. Then, the tangential direction acceleration calculation unit 119 may use at least one of these physical quantities for calculating optimum tangential direction acceleration, optimum tangential direction jerk, and an optimum physical quantity by differentiating a position in a tangential direction with respect to time three times or more. The deceleration target speed calculation unit 121 may calculate deceleration target speed by using at least one of these physical quantities. Information about acceleration including acceleration, jerk, and a physical quantity calculated by differentiating a position with respect to time three times or more is widely called "acceleration related information."

Although the embodiment of the present invention is described above, the present invention is not limited to the embodiment described above. The effects described in the present embodiment are obtained by simply listing preferred effects produced from the present invention, and the effects of the present invention are not limited to the effects described in the present embodiment.

The method of controlling the numerical controller 1 is realized by software. When it is realized by software, programs forming the software are installed into a computer (the numerical controller 1). These programs may be distributed to users by being recorded in removable media or may be distributed by being downloaded into the computers of the users through a network. Furthermore, these programs may be provided to the computers (the numerical controllers 1) of the users as a Web service through a network without being downloaded.

EXPLANATION OF REFERENCE NUMERALS

1 Numerical controller
111 Command analysis unit
112 First interpolation unit
113 Control point coordinate system calculation unit
114 Control target tangential direction acceleration calculation unit
114A Tool tangential direction acceleration calculation unit
114B Workpiece tangential direction acceleration calculation unit
115 Control target speed limit calculation unit
115A Tool speed limit calculation unit
115B Workpiece speed limit calculation unit
116 Conversion unit
117 Drive axis tangential direction acceleration calculation unit
118 Drive axis speed limit calculation unit
119 Tangential direction acceleration calculation unit
120 Speed limit calculation unit
121 Deceleration target speed calculation unit
122 Acceleration/deceleration processing unit
123 Second interpolation unit
124 Servo control unit
125 Tangential direction acceleration calculation memory
126 Speed limit calculation memory
127 Intermediate memory

What is claimed is:
1. A controller that generates a movement command pulse that controls at least one servo motor of a machine based on a command in a program for controlling the machine having at least one drive axis respectively controlled by the at least one servo motor, wherein the machine has a machine coordinate system as an orthogonal coordinate system, the controller exerting acceleration/deceleration control over the drive axis via the respective servo motor so as to satisfy a condition for the acceleration/deceleration in each of (i) the machine coordinate system and (ii) a drive axis coordinate system by performing normalization of each of acceleration/deceleration related information in the machine coordinate system and acceleration/deceleration related information in the drive axis coordinate system to a value in the drive axis coordinate system, wherein, in performing the normalization, the controller:
converts a position and a movement amount of a control target in the machine coordinate system and a position and a movement amount of an origin position of the machine coordinate system into a position and a movement amount in the drive axis coordinate system, and multiplies a tangential direction acceleration and a speed limit in the machine coordinate system by a ratio between the movement amounts in both coordinate systems, to obtain a tangential direction acceleration and a speed limit in the drive axis coordinate system.

2. A controller that generates a movement command pulse that controls at least one servo motor of a machine based on a command in a program for controlling the machine having at least one drive axis respectively controlled by the at least one servo motor, wherein the machine has a machine coordinate system as an orthogonal coordinate system, the controller comprising:
- a control target tangential direction acceleration calculation unit that calculates control target tangential direction acceleration related information of a control target in the machine coordinate system based on a position of the control target in the machine coordinate system and control target maximum allowable acceleration related information about each orthogonal axis of the machine coordinate system;
- a control target speed limit calculation unit that calculates control target speed limit of the control target in the orthogonal coordinate system based on: (i) the position of the control target and (ii) the control target maximum allowable acceleration related information;
- a conversion unit that sets a drive axis coordinate system, and converts the position and a movement amount of the control target contained in the command in the program to a position and the movement amount of the drive axis in the drive axis coordinate system;
- a drive axis tangential direction acceleration calculation unit that calculates drive axis tangential direction acceleration related information of the drive axis based on: (i) the position of the drive axis and (ii) drive axis maximum allowable acceleration related information of each drive axis;
- a drive axis speed limit calculation unit that calculates a drive axis speed limit based on: (i) the position of the drive axis and (ii) the drive axis maximum allowable acceleration related information;
- a tangential direction acceleration calculation unit that calculates optimum tangential direction acceleration related information based on: (i) acceleration related information resulting from conversion of the control target tangential direction acceleration related information to a value in the drive axis coordinate system and (ii) the drive axis tangential direction acceleration related information;
- a speed limit calculation unit that calculates optimum speed limit based on: (i) a speed limit resulting from conversion of the control target speed limit to a value in the drive axis coordinate system and (ii) the drive axis speed limit;
- a deceleration target speed calculation unit that calculates deceleration target speed based on: (i) the position of the drive axis, (ii) the optimum tangential direction acceleration related information, and (iii) the optimum speed limit; and
- a control unit that generates the movement command pulse that controls movement of the at least one servo motor, and to thereby control the at least one drive axis, based on at least the deceleration target speed.

3. The numerical controller according to claim 2, wherein the control target includes multiple control targets,
- the control target tangential direction acceleration calculation unit calculates allowable tangential direction acceleration related information about each of the control targets, and
- the control target speed limit calculation unit calculates speed limit for each of the control targets.

4. The numerical controller according to claim 2, wherein each of the control target maximum allowable acceleration related information and the drive axis maximum allowable acceleration related information includes at least one of speed, acceleration, jerk, and a physical quantity calculated by differentiating a position with respect to time three times or more.

5. The numerical controller according to claim 2, wherein each of the control target tangential direction acceleration related information, the drive axis tangential direction acceleration related information, and the optimum tangential direction acceleration related information includes at least one of acceleration, jerk, and a physical quantity are calculated by differentiating a position with respect to time three times or more.

6. The numerical controller according to claim 2, further comprising a control point coordinate system calculation unit that sets machine configuration data reflecting an axis configuration for moving the control target, and calculates the coordinate value of the control target in the orthogonal coordinate system based on the command in the program and the machine configuration data.

* * * * *